Patented Feb. 23, 1943

2,311,669

UNITED STATES PATENT OFFICE 2,311,669

GALVANIZING PROCESS AND COMPOSITION

Raymond J. Kepfer, Lakewood, Ohio, assignor to E. I. du Pont de Nemours & Company, Wilmington, Del., a corporation of Delaware No Drawing. Application October 21, 1941, Serial No. 415,950

10 Claims. (Cl. 148—23)

This invention relates to flux compositions and processes for hot-dip galvanizing, and is particularly directed to prepared flux compositions and to processes wherein an isoamketaldoresin is used as a foaming agent.

In hot-dip galvanizing a bath of molten zinc is covered with a flux. As articles to be galvanized are lowered into the molten zinc bath, they first pass thru the flux where they are cleaned and prepared for the reception of a metal coating. It has heretofore been the practice to add a material such as glycerine or tallow to the flux on the molten bath in order to produce a foam or froth. This foam serves to entrap vapors and gases, and to retard the rate of volatilization of the flux. In the course of a galvanizing operation it has been necessary to replace such of the flux as has been volatilized, and it has also been necessary to add foam producing material to maintain a foam blanket of the desired thickness and character.

A considerable loss of flux and of foam producing agent has hitherto resulted from the fact that these compositions were added separately and at the judgment of the galvanizer. At times there was not enough of the foaming agent present to maintain a foam of the proper consistency and thickness with the result that an excessive amount of flux was lost by volatilization. At other times, and especially immediately following its addition, there was present an excess of poorly mixed foaming material, with the result that some of it was decomposed and charred by the high temperatures of the galvanizing pot. In addition to thus wasting foaming agent, this decomposition and charring resulted in the formation of charred particles which interfered with the galvanizing operation.

A further disadvantage of the foaming or frothing type of galvanizing fluxes heretofore available has been that after a considerable period of use of the fluxes had a tendency to thicken appreciably. This thickening is very detrimental to the galvanizing operation because it slows down production due to an increased period of time required for drainage of the flux from the galvanized article, increases loss of flux by reason of increased drag-out, and lowers the quality of the galvanizing job because the thickened flux adheres badly to the finished metal.

It is an object of this invention to provide processes and compositions whereby an optimum foam thickness and consistency are easily maintained, and whereby there is a minimum loss of flux and foaming agent. A further object of this invention is to provide a prepared composition which may be conveniently and easily used. A still further object is the provision of novel foaming agents of improved character. Other objects will appear hereinafter.

The foregoing and other objects of this invention are accomplished by the use of an isoamketaldoresin in a flux composition. By mixing an isoamketaldoresin with a predetermined amount of flux a galvanizer is enabled to add the flux and foaming agent conveniently and in the proportions required to obtain the desired height and consistency of foam. Using such a prepared mixture there is no excessive loss of flux by volatilization. Moreover, as the flux and foaming agent are intimately mixed and are in the proper proportions there is but little charring of the foaming agent.

The mixed compositions of this invention are composed of an isoamketaldoresin as a foaming agent and a chloride flux selected from the group consisting of zinc chloride, ammonium chloride, and zinc ammonium chloride.

The foaming materials contemplated for use in galvanizing according to this invention are broadly designated as isoamketaldoresins and are described in U. S. Patent 2,085,750 to Henricks dated July 6, 1937. Within the broad class of isoamketaldoresins any of the special classes described in the Henricks patent may be used. Thus there may be used in the amketaldoresins, the isoamaldacets, the amaldacets or any of the other compositions the use of which as addition agents is disclosed in the Henricks patent. There may be used, for example, such amaldacets as are formed by the reaction of crotonaldehyde with mono-ethanolamine, reaction of aldol with monomethanolamine, reaction of aldol with mono-, di-, or triethanolamine, reaction of aldol with ammonia, reaction of crotonaldehyde with ammonium hydroxide or ammonia gas, or reaction of acetaldehyde with gaseous ammonia. Similarly, there may be used amaldacets produced by the reaction of acetaldehyde with sodium cyanide. More specifically, it may be preferred to employ as a foaming agent a reaction product of an alkaline cyanide with an aldacet, that is, for instance, a reaction product of sodium cyanide with aldol, paraldol, crotonaldehyde, or acetaldehyde.

The amount of an isoamketaldoresin used with a metal chloride to produce a foaming galvanizing flux according to this invention may be considerably varied and will in any particular instance depend upon the condition of use of the flux. When a prepared composition is to be employed in a basket-process or in a process of similar type, it is desirable to maintain a deep heavy foam. A composition for this purpose would contain a relatively large amount of foaming agent, say from 0.5 to 5.0 per cent. However, in the so-called hook-process in which articles are suspended from hooks when lowered into the bath, it is necessary to use a somewhat lighter and thinner foam, as otherwise the articles will not penetrate the foam but will float off the hooks and become detached. For this type of process the flux composition should contain a somewhat smaller amount of foaming agent, say from about 0.1 to 1.0 per cent.

According to this invention, isoamketaldoresins may be incorporated with suitable metal chlorides to give prepared galvanizing flux compositions or they may be added separately to the galvanizing bath.

It will be understood that while this invention is particularly adapted to hot dip galvanizing, it may advantageously be applied to other hot dip processes. It may, for instance, be applied to processes of hot dip coatings which use molten baths of tin, lead, or cadmium.

The nature of galvanizing compositions and processes of this invention are illustrated in the following examples which are not to be construed as limiting.

Example I describes the use, with zinc ammonium chloride, as a galvanizing flux, of an isoamketaldoresin, more specifically an amaldacet formed by the reaction of aldol and sodium cyanide.

*Example I*

For use as a flux foaming agent an isoamketaldoresin was prepared as described in Example X, pages 4 and 5, of Henricks Patent 2,085,750. Thus, 5 parts by weight of technical aldol were added to a solution containing 3 parts, by weight, of sodium cyanide in 10 parts, by weight, of water. The reaction receptacle, to which the aldol was added, was provided with a water-cooling means, and convenient means were provided for heating the receptacle as required. By adding the aldol slowly and employing the cooling means, the temperature of the reaction mixture was held between 45° to 50° C. This temperature was maintained for about two and one-half hours, cooling or heating the receptacle as required. As the aldol was added, and for a time thereafter, the heat of the reaction necessitated a continuous cooling of the reaction mixture to hold the temperature within the desired limits. Later it became necessary to supply heat to the reaction mixture to maintain the temperature. During the reaction a small amount of ammonia was liberated, as was evidenced by the characteristic odor.

In order to purify and concentrate this product, the solution, after being allowed to cool, was made neutral to litmus with a dilute solution of sulfuric acid. The acid solution consisted of one part by volume of water to one part by volume of concentrated sulfuric acid. There was then added an excess of 10 per cent over the volume of dilute acid required to neutralize the solution. Sodium sulfate was precipitated, and the excess acid used depressed its solubility. The temperature was not allowed to go above 50° C. during this neutralization treatment. Hydrocyanic acid gas was evolved during the treatment and means were provided for disposing of it.

The acid treated solution was allowed to stand for several hours and a dark red fraction rose to the top. This top layer was removed and centrifuged.

The separated top layer, which constitutes a preferred foaming agent for addition to galvanizing fluxes according to this invention is a viscous liquid, dark red in color, and it has a specific gravity of about 1.20. At temperatures as low as —17° C. it remains liquid, but at the temperature produced with a freezing mixture of solid carbon dioxide and acetone (below —80° C.) a brittle solid, apparently non-crystalline, is formed. This product is substantially insoluble in such solvents as ether, benzene, and petroleum ether. It is, however, completely soluble in alcohol and acetone. It will be understood that this purified product constitutes an amaldacet being a single class of compositions within the broader class designated as isoamketaldoresins.

A prepared galvanizing flux was made up by mixing 0.7 part by weight of the above-described isoamketaldoresin with 100 parts of zinc ammonium chloride. The resulting mixture was a dry free-flowing material the physical characteristics of which were not substantially different from those of the original zinc ammonium chloride.

The ability of the prepared flux composition of this example to produce a froth on a galvanizing bath was demonstrated by adding a portion of the mixture to a molten zinc bath at 900° F. Observations were made of the height to which the flux froth rose and the time necessary for the froth again to subside. It was found that the average maximum height to which the froth rose was 6½ inches and the average time required for it to rise and subside was 24 minutes.

The effect of a larger proportion of isoamketaldoresin resin is shown in Example II.

*Example II*

A galvanizing flux was prepared by mixing 1.4 parts by weight of the isoamketaldoresin described in Example I with 100 parts by weight of zinc ammonium chloride, and the mixture was tested for foaming characteristics as described in Example I. It was found that the average maximum height to which the froth rose was 5 inches and the average time required for it to rise and subside was 33 minutes.

The preparation of a flux using a smaller proportion of isoamketaldoresin and the ability of this flux to resist thickening over a substantial period of time as shown in Example III.

*Example III*

A prepared galvanizing flux was made up by mixing 0.55 part by weight of the isoamketaldoresin described in Example I with 100 parts of zinc ammonium chloride. The foaming characteristics of this flux were demonstrated in the following manner. Over a period of three hours, a substantial amount of this mixture was added portionwise to a zinc bath held at 900° F. On a similar portion of the zinc bath an equal amount of a mixture of zinc ammonium chloride and 0.75 per cent by weight of glycerine were similarly placed and observations were made of the relative behavior of the two flux mixtures. Essentially equal amounts of froth which lasted for equal lengths of time were produced by the two fluxes, but after a period of heating of 10 hours glycerine formulations had a viscosity of 202 centipoises while the isoamketaldoresin formulations had a viscosity of only 180 centipoises, and after 11½ hours heating the glycerine formulation had a viscosity of 308 centipoises compared with 250 centipoises for the isoamketaldoresin formulation.

Isoamketaldoresins may be used to advantage with other chloride fluxes as well as the zinc ammonium chloride of Examples I to III. Example IV shows such a use with ammonium chloride.

*Example IV*

A prepared galvanizing flux was made up by mixing 0.53 part by weight of the isoamketaldoresin prepared as described in Example I with 100 parts by weight of ammonium chloride. The foaming characteristics of this flux were compared with the foaming characteristics of a mixture of 0.75 per cent glycerine with ammonium chloride on a zinc bath held at 875° F. using the technique described in Example III above. Here again equal amounts of froth which lasted for equal lengths of time were produced by the two fluxes, but after periods of heating of 6, 8, and 10 hours, the glycerine formulation had viscosities of 100, 154, and 244 centipoises respectively, while the isoamketaldoresin formulation flux showed only 96, 140, and 208 centipoises respectively.

Isoamketaldoresins may of course be used in conjunction with conventional foaming agents and addition agents for galvanizing fluxes, and in some instances economies and operating advantages may thereby be achieved.

While in the foregoing description of this invention certain specific compositions and processes have been described, it will be understood that without departing from the spirit of this invention those skilled in the art may readily employ various galvanizing processes and compositions.

I claim:

1. A prepared foaming flux composition for use on a bath of molten metal comprising a chloride flux selected from the group consisting of zinc chloride, ammonium chloride, and zinc ammonium chloride and an isoamketaldoresin as a foaming agent.

2. A prepared foaming flux composition for use on a bath of molten metal comprising a chloride flux selected from the group consisting of zinc chloride, ammonium chloride, and zinc ammonium chloride and an isoamaldacet as a foaming agent.

3. A prepared foaming flux composition for use on a bath of molten metal comprising a chloride flux selected from the group consisting of zinc chloride, ammonium chloride, and zinc ammonium chloride and an amaldacet as a foaming agent.

4. A prepared foaming flux composition for use on a bath of molten metal comprising a chloride flux selected from the group consisting of zinc chloride, ammonium chloride, and zinc ammonium chloride and a reaction product of an alkaline cyanide with an aldacet as a foaming agent.

5. A prepared foaming flux composition for use on a bath of molten metal comprising a chloride flux selected from the group consisting of zinc chloride, ammonium chloride, and zinc ammonium chloride and a reaction product of sodium cyanide with aldol as a foaming agent.

6. In a process for the hot dip coating of metals, the step comprising producing a foam by the addition to the galvanizing flux of a foaming agent comprising an isoamketaldoresin.

7. In a process for the hot dip coating of metals, the step comprising producing a foam by the addition to the galvanizing flux of a foaming agent comprising an isoamaldacet.

8. In a process for the hot dip coating of metals, the step comprising producing a foam by the addition to the galvanizing flux of a foaming agent comprising an amaldacet.

9. In a process for the hot dip coating of metals, the step comprising producing a foam by the addition to the galvanizing flux of a foaming agent comprising a reaction product of an alkaline cyanide with an aldacet.

10. In a process for the hot dip coating of metals, the step comprising producing a foam by the addition to the galvanizing flux of a foaming agent comprising a reaction product of sodium cyanide with aldol.

RAYMOND J. KEPFER.